(12) United States Patent
Boyd

(10) Patent No.: US 6,788,437 B1
(45) Date of Patent: Sep. 7, 2004

(54) DEVICE FOR SCANNING REFLECTIVE AND TRANSMISSIVE DATA FROM A PHOTOGRAPHIC IMAGE

(75) Inventor: David W Boyd, Greeley, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/703,940

(22) Filed: Oct. 31, 2000

(51) Int. Cl.[7] .................................................. H04N 1/04
(52) U.S. Cl. ..................... 358/475; 358/487; 358/474; 382/317
(58) Field of Search ................................ 358/475, 487, 358/474, 473, 496, 497, 506, 505, 462, 486; 382/317

(56) References Cited

U.S. PATENT DOCUMENTS 4,760,606 A * 7/1988 Lesnick et al. ............ 382/306
5,457,547 A * 10/1995 Yamada ..................... 358/487
5,463,217 A   10/1995 Sobol et al.
5,574,274 A   11/1996 Rubley et al.
5,673,125 A    9/1997 Merecki et al.
5,814,809 A    9/1998 Han

FOREIGN PATENT DOCUMENTS

WO    WO99/37086    7/1999

* cited by examiner

Primary Examiner—Kimberly Williams
Assistant Examiner—Negussie Worku
(74) Attorney, Agent, or Firm—Leslie P. Gehman

(57) ABSTRACT

An image capture device, such as a scanner, is built including hardware necessary to capture both reflective and transmissive image data from a transparency. The device may associate the two types of data internally or rely on other hardware, such as a controlling computer, to do the association of the two quantities of data. In one possible embodiment, the device would include the ability to perform optical character recognition (OCR) of the reflective data (or the transmissive data, if desired), converting to a type of text format any printing on the transparency.

24 Claims, 5 Drawing Sheets

DEVICE FOR SCANNING REFLECTIVE AND TRANSMISSIVE DATA FROM A PHOTOGRAPHIC IMAGE

FIELD OF THE INVENTION

The present invention relates to an image capture system and, more particularly, to a method and apparatus for capturing reflective and transmissive data from an image.

BACKGROUND OF THE INVENTION

Image capture devices are currently used for a wide variety of applications. Typical applications include document scanning (possibly including optical character recognition (OCR)), digital photography, photographic print scanning, and photographic transparency scanning. Many photographers currently capture images to photographic films using standard 35 mm, medium format, or large format cameras. The resulting film (or print) may then be digitally captured using a scanner. Many of these scanners allow only the capture of images from either transparencies or prints. Some scanners, such as the Hewlett-Packard a PhotoSmart™ S20 (Hewlett-Packard Company, Palo Alto, Calif.), allow the user to choose between scanning a print, a 35 mm mounted transparency, or a strip of 35 mm film.

Many photographers use transparency film, since many current publications prefer to have images submitted in this format. The images are then scanned for inclusion in the publication and the transparencies are returned to the photographer. Such photographers may have collections of tens of thousands of transparencies that must be organized in a way that the photographer is able to find a particular image at any later date. 35 mm transparencies typically are mounted in plastic or cardboard 2 inch by 2 inch (50.8 mm by 50.8 mm) mounts. Many photo labs print a frame number on each mount and may also print the month and year the film was processed on the mount. Some photo labs use mounts that are pre-printed with the brand of film or processing that was used. Also, when 35 mm transparencies are duplicated, the duplicate transparencies are typically labeled to distinguish them from the original slide. While all of this information from the photo lab helps in organization of the collection of slides, it rarely is sufficient to catalog a large collection. Many photographers place further identification on each slide mount, such as a roll number, subject of the slide, copyright notice, location where the slide was shot, and/or the name and address of the photographer.

By printing or writing all of this information directly on the slide mount, the photographer is assured that the information is securely associated with a particular image. However, should the photographer scan some or all of a collection of images, this information may be neglected. If not neglected, the information likely will have to be manually entered into a database for association with the proper image. This process may be error prone when a large number of images are captured or scanned in a single session. Thus, there is a need in the art for a method and/or apparatus that allows users to electronically capture both the image data and any associated information for the image.

SUMMARY OF THE INVENTION

An image capture device, such as a scanner, is built including hardware necessary to capture both reflective and transmissive image data from a transparency. The device may associate the two types of data internally or rely on other hardware, such as a controlling computer, to do the association of the two quantities of data. In one possible embodiment, the device would include the ability to perform optical character recognition (OCR) of the reflective data (or the transmissive data, if desired), converting to a type of text format any printing on the transparency.

Other aspects and advantages of the present invention will become apparent from the following detailed description, taken in conjunction with the accompanying drawings, illustrating by way of example the principles of the invention.

DETAILED DESCRIPTION

Figure 1:
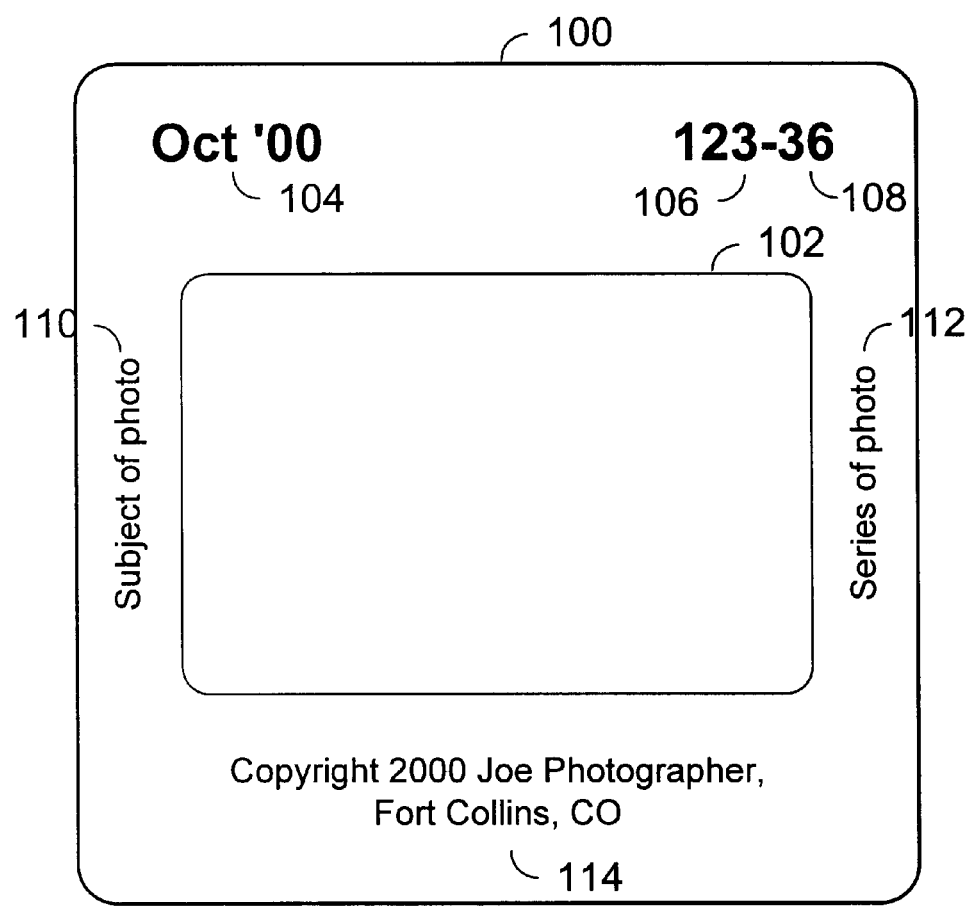
FIG. 1 is a plan view of an example photographic transparency with information included on the transparency mount.

FIG. 1 is a plan view of an example photographic transparency with information included on the transparency mount. FIG. 1 is an example of some of the information that might appear on the mount portion of a 35 mm transparency. In this example the slide mount 100 includes an opening 102 where the actual film is mounted. Surrounding this opening 102 may be a variety of written or printed information such as a date 104, roll number 106, frame number 108, note about the subject of the photo 110, note about the series of the photo 112, and/or copyright notice 114.

Figure 2:
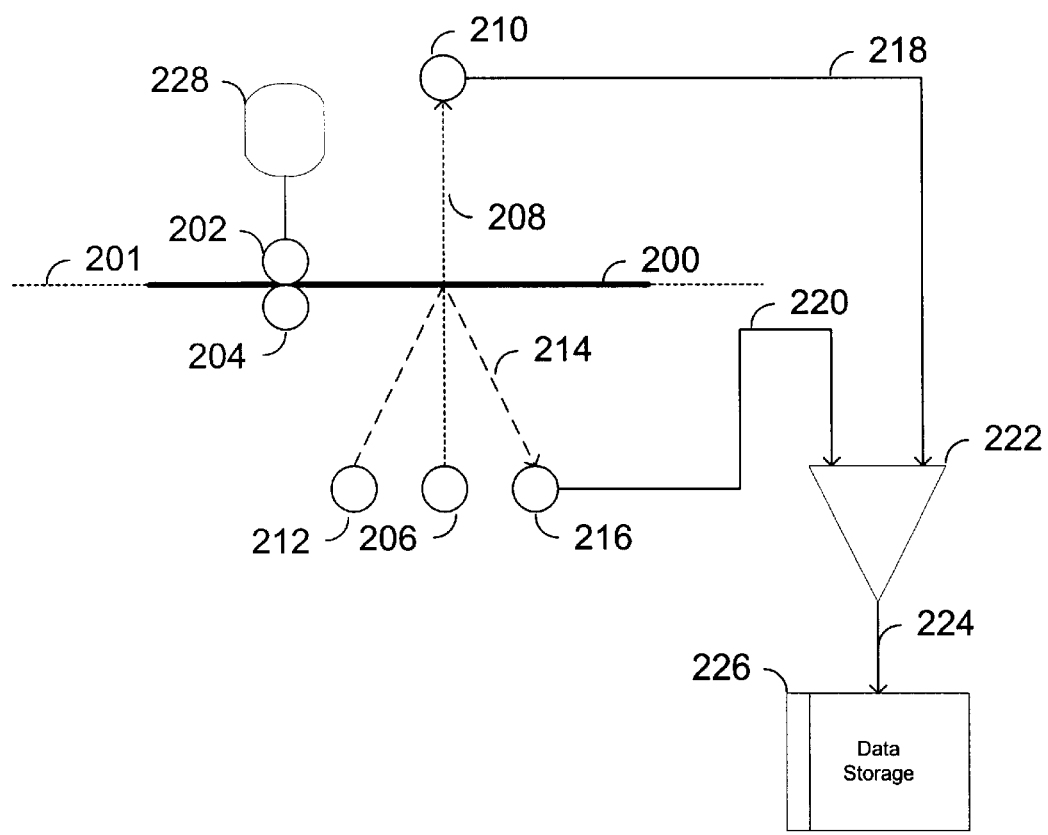
FIG. 2 is a block diagram side view of one possible embodiment of an apparatus for capturing both reflective and transmissive data from a photographic transparency.

FIG. 2 is a block diagram side view of one possible embodiment of an apparatus for capturing both reflective and transmissive data from a photographic transparency. In this example configuration, the transparency 200 is shifted by an upper roller 202 and a lower roller 204 driven by a motor 228 past reflective and transmissive scanner hardware. The transmissive portion of the transparency 200 is illuminated by a transmissive light source 206. The transmissive light path 208 passes through the transparency 200 and strikes the transmissive sensor 210 where the transmissive image data is captured. The opaque portion of the transparency 200 is illuminated by a reflective light source 212. The reflective light path 214 reflects off the opaque portions of the transparency 200 and strikes the reflective sensor 216 where the reflective image data is captured. The transmissive image data and reflective image data are captured concurrently. The data from the transmissive sensor 218 is associated with the data from the reflective sensor 220 in an association step 222 and the associated data 224 may then be stored in a data storage unit 226. Note that the association step 222 may take place in hardware, or it may simply consist of a data structure associating the two images within the data storage unit 226.

Figure 3:
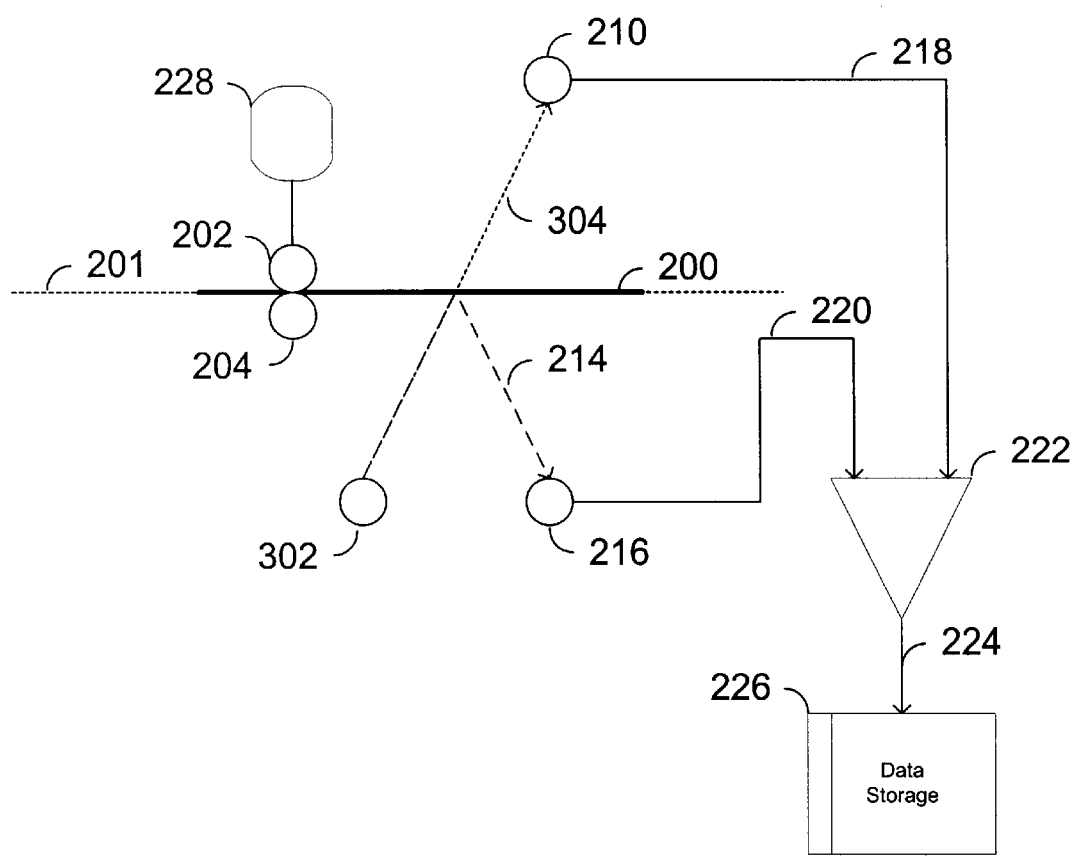
FIG. 3 is a block diagram side view of one possible embodiment of an apparatus for capturing both reflective and transmissive data from a photographic transparency using a single light source.

FIG. 3 is a block diagram side view of one possible embodiment of an apparatus for capturing both reflective and transmissive data from a photographic transparency using a single light source. In this example configuration, the transparency 200 is shifted by an upper roller 202 and a lower roller 204 driven by a motor 228 through an image plane 201 past reflective and transmissive scanner hardware. The transmissive portion of the transparency 200 is illuminated by a light source 302. The transmissive light path 304 passes through the transparency 200 and strikes the transmissive sensor 210 where the transmissive image data is captured. The opaque portion of the transparency 200 is illuminated by a light source 302. The reflective light path 214 reflects off the opaque portions of the transparency 200 and strikes the reflective sensor 216 where the reflective image data is captured. The transmissive image data and reflective image data are captured concurrently. The data from the transmissive sensor 218 is associated with the data from the reflective sensor 220 in an association step 222 and the associated data 224 may then be stored in a data storage unit 226. Note that the association step 222 may take place in hardware, or it may simply consist of a data structure associating the two images within the data storage unit 226.

Figure 4A:
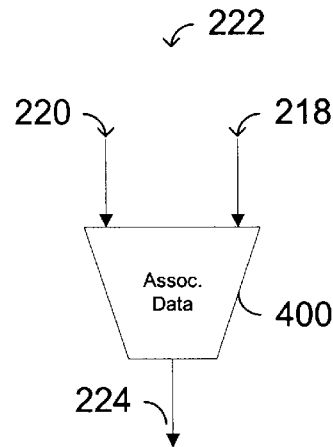
FIG. 4A and FIG. 4B are block diagrams of possible contents of the processing block from FIG. 2 and FIG. 3.
Figure 4B:
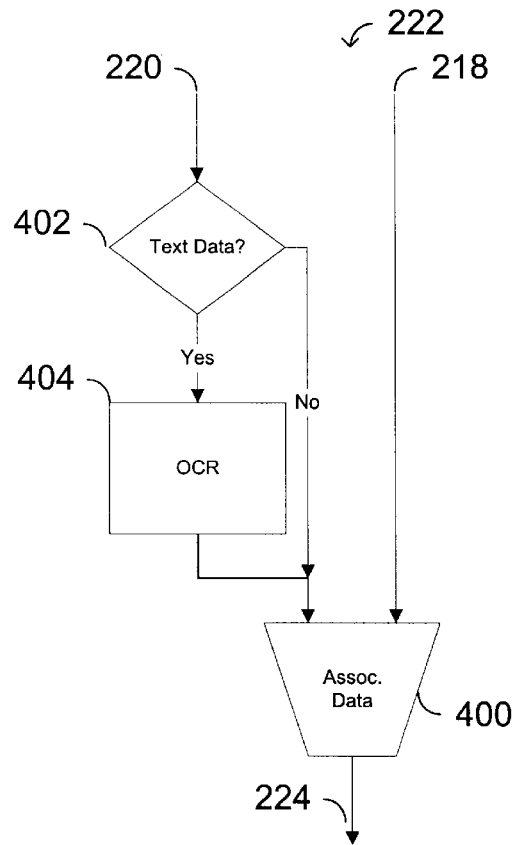

FIG. 4A and FIG. 4B are block diagrams of possible contents of the processing block 222 from FIG. 2 and FIG. 3. In a simple embodiment, shown in FIG. 4A, the data from the transmissive sensor 218 and the data from the reflective sensor 220 are simply associated with each other as they are output 224 for storage. In a somewhat more powerful configuration, shown in FIG. 3B, the data from the reflective sensor 220 is examined in a reflective decision step 402. If the reflective digital image data 220 contains textual information the data is passed through a reflective OCR 404 where it is converted to reflective text data. Otherwise, the reflective digital image data 220 bypasses the reflective OCR 404 and goes directly to the association block 400. Within the association block 400, the transmissive digital image data 218 is associated with the reflective digital image data 220 when neither image data contains textual information. The transmissive digital image data 218 is associated with the reflective text data when the reflective image data contains textual information.

Figure 5:
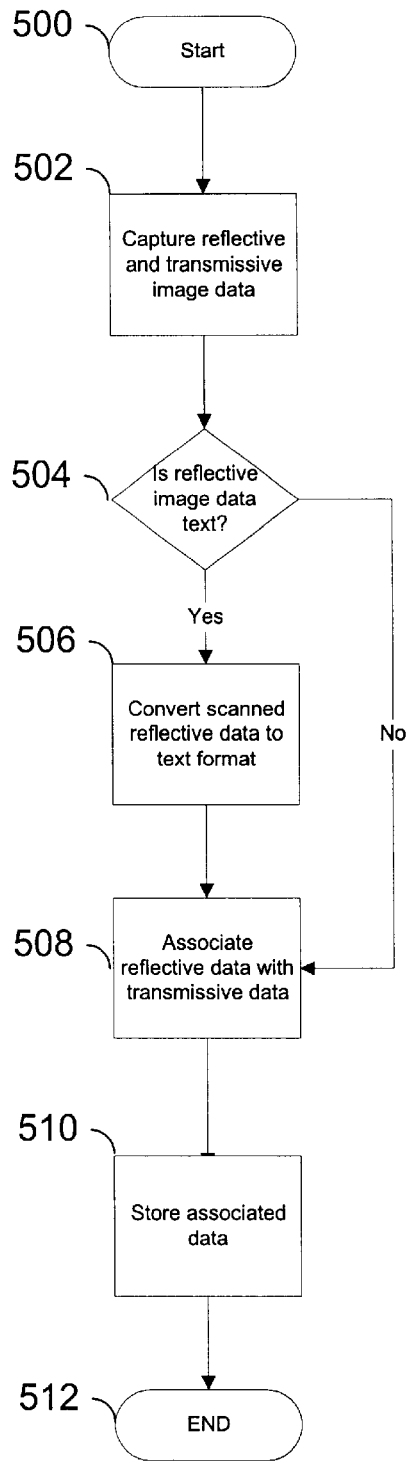
FIG. 5 is a flowchart of a method for capturing both reflective and transmissive data from a photographic transparency concurrently.

FIG. 5 is a flowchart of a method for capturing both reflective and transmissive data from a photographic transparency concurrently. After a start step 500, in a scanning step 502, transmissive image data and reflective image data is captured. Note that this scanning step 502 may be implemented in two sub-steps where the transmissive image data is collected in one sub-step and the reflective image data is collected in another sub-step. In an optional reflective decision step 504, if the reflective image data comprises text, an optional reflective OCR step 506 may be performed to convert the reflective image data into textual data. In an association step 508, the reflective image or text data is associated with the transmissive image or text data, and in a storage step 510 the associated data is stored in memory, on a hard disk, on a CDROM, or on other recordable media. The method then reaches an end step 512.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An image capture device comprising:

a light source configured to illuminate at least an opaque portion of an object in an imaging plane, and at least a transmissive portion of an object in said imaging plane, a transmissive sensor positioned relative to said light source to capture transmissive image data from said transmissive portion of an object;

a reflective sensor positioned relative to said light source to capture reflective image data from said opaque portion of an object, wherein said transmissive image data and said reflective image data are captured concurrently; and an association device that associates said reflective image data with said transmissive image data.

2. The image capture device recited in claim 1 further comprising:

a motor coupled to said object, that moves said object relative to said sensors through said imaging plane.

3. The image capture device recited in claim 1 further comprising:

a motor coupled to said sensors, that moves said sensors relative to said imaging plane.

4. An image capture device comprising:

a light source configured to illuminate at least an opaque portion of an object in an imaging plane, and at least a transmissive portion of an object in said imaging plane, a transmissive sensor positioned relative to said light source to capture transmissive image data from said transmissive portion of an object;

a reflective sensor positioned relative to said light source to capture reflective image data from said opaque portion of an object, wherein said transmissive image data and said reflective image data are captured concurrently;

an optical character recognition device that receives said reflective image data from said reflective sensor and converts said reflective image data into reflective text data when said reflective image data contains textual information; and an association device that associates said reflective text data with said transmissive image data.

5. The image capture device recited in claim 4 further comprising:

a motor coupled to said object, that moves said object relative to said sensors through said imaging plane.

6. The image capture device recited in claim 4 further comprising:

a motor coupled to said sensors, that moves said sensors relative to said imaging plane.

7. An image capture device comprising:

a light source configured to illuminate at least an opaque portion of an object in an imaging plane, and at least a transmissive portion of an object in said imaging plane, a transmissive sensor positioned relative to said light source to capture transmissive image data from said transmissive portion of an object;

a reflective sensor positioned relative to said light source to capture reflective image data from said opaque portion of an object, wherein said transmissive image data and said reflective image data are captured concurrently;

a text detector configured to receive said reflective image data from said reflective sensor, wherein said text detector signals presence of textual information in said reflective image data;

an optical character recognition device connected to said reflective sensor and said text detector, wherein said optical character recognition device converts said reflective image data into reflective text data when said text detector signals the presence of text data in said reflective image data; and an association device that associates said reflective image data with said transmissive image data when said text detector does not signal the presence of text data in said reflective image data, and associates said reflective text data with said transmissive image data when text detector signals the presence of text data in said reflective image data.

8. The image capture device recited in claim 7 further comprising:

a motor coupled to said object, that moves said object relative to said sensors through said image plane.

9. The image capture device recited in claim 7 further comprising:

a motor coupled to said sensors, that moves said sensors relative to said object.

10. An image capture device comprising:

a first light source configured to illuminate at least a transmissive portion of an object in an imaging plane;

a transmissive sensor positioned relative to said first light source to capture transmissive image data from said transmissive portion of said object;

a second light source configured to illuminate at least an opaque portion of said object;

a reflective sensor positioned relative to said second light source to capture reflective image data from said opaque portion of said object, wherein said transmissive image data and said reflective image data are captured concurrently; and an association device that associates said reflective image data with said transmissive image data.

11. The image capture device recited in claim 10 further comprising:

a motor coupled to said object, that moves said object relative to said sensors through said imaging plane.

12. The image capture device recited in claim 10 further comprising:

a motor coupled to said sensors, that moves said sensors relative to said imaging plane.

13. An image capture device comprising:

a first light source configured to illuminate at least a transmissive portion of an object in an imaging plane;

a transmissive sensor positioned relative to said first light source to capture transmissive image data from said transmissive portion of said object;

a second light source configured to illuminate at least an opaque portion of said object;

a reflective sensor positioned relative to said second light source to capture reflective image data from said opaque portion of said object, wherein said transmissive image data and said reflective image data are captured concurrently;

an optical character recognition device that receives said reflective image data from said reflective sensor and converts said reflective image data into reflective text data when said reflective image data contains textual information; and an association device that associates said reflective text data with said transmissive image data.

14. The image capture device recited in claim 13 further comprising:

a motor coupled to said object, that moves said object relative to said sensors through said imaging plane.

15. The image capture device recited in claim 13 further comprising:

a motor coupled to said sensors, that moves said sensors relative to said imaging plane.

16. An image capture device comprising:

a first light source configured to illuminate at least a transmissive portion of an object in an imaging plane;

a transmissive sensor positioned relative to said first light source to capture transmissive image data from said transmissive portion of said object;

a second light source configured to illuminate at least an opaque portion of said object;

a reflective sensor positioned relative to said second light source to capture reflective image data from said opaque portion of said object, wherein said transmissive image data and said reflective image data are captured concurrently;

a text detector configured to receive said reflective image data from said reflective sensor, wherein said text detector signals presence of textual information in said reflective image data;

an optical character recognition device connected to said reflective sensor and said text detector, wherein said optical character recognition device converts said reflective image data into reflective text data when said text detector signals the presence of text data in said reflective image data; and an association device that associates said reflective image data with said transmissive image data when said text detector does not signal the presence of text data in said reflective image data, and associates said reflective text data with said transmissive image data when text detector signals the presence of text data in said reflective image data.

17. The image capture device recited in claim 16 further comprising:

a motor coupled to said object, that moves said object relative to said sensors through said image plane.

18. The image capture device recited in claim 16 further comprising:

a motor coupled to said sensors, that moves said sensors relative to said object.

19. A method for capturing images comprising the steps of:

a) digitally capturing transmissive image data from at least a transparent portion of an object in an imaging plane;

b) digitally capturing reflective image data from at least an opaque portion of said object, concurrently with said digitally capturing transmissive image data step; and c) associating said reflective image data with said transmissive image data.

20. The method for capturing images recited in claim 19 further comprising the step of:

d) performing optical character recognition on said reflective image data producing reflective text data when said reflective image data contains textual information.

21. The method for capturing images recited in claim 20 further comprising the step of:

d) associating said reflective text data with said transmissive image data.

22. An image capture device comprising:

means for capturing transmissive image data from at least a transparent portion of an object in an imaging plane;

means for capturing reflective image data from at least an opaque portion of said object concurrently with capturing said transmissive image data; and means for associating said transmissive image data with said reflective image data.

23. The image capture device recited in claim 22 further comprising:

means for converting said reflective image data into reflective text data when said reflective image data contains textual information.

24. The image capture device recited in claim 23 further comprising:

means for associating said transmissive image data with said reflective text data.

* * * * *